Nov. 8, 1955 K. A. PRICE ET AL 2,723,093
RAM-AIR POWERED, TANDEM REAR LAUNCHING SYSTEM
Filed June 25, 1953 2 Sheets-Sheet 1

INVENTORS:
Kenneth A. Price
Connelly L. Graham

By Herbert E. Metcalf
Their Patent Attorney

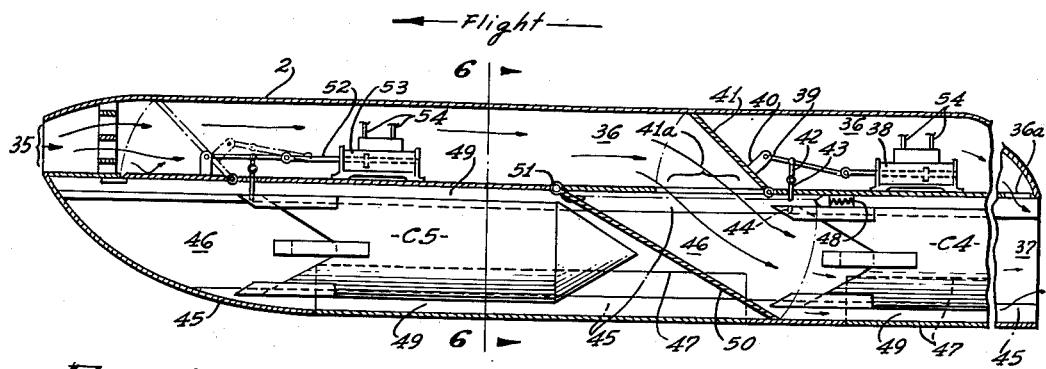
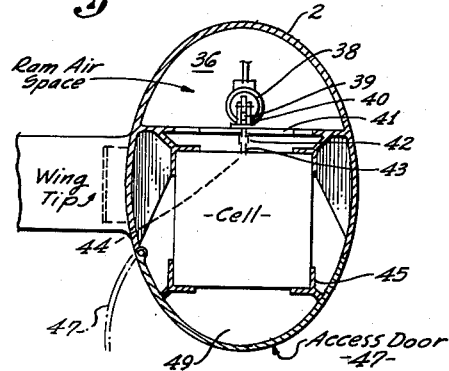
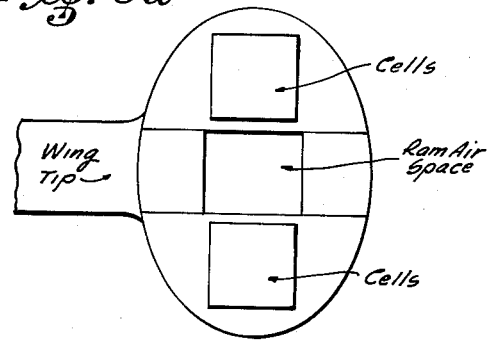
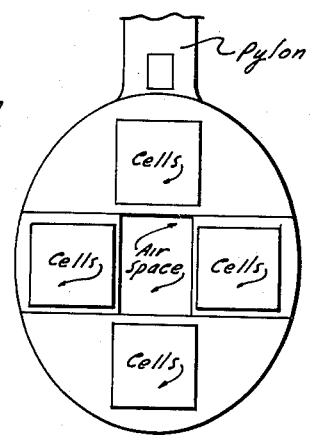
INVENTORS:
Kenneth A. Price
Connelly L. Graham
Their Patent Attorneys

United States Patent Office 2,723,093
Patented Nov. 8, 1955

2,723,093

RAM-AIR POWERED, TANDEM REAR LAUNCHING SYSTEM

Kenneth A. Price, Pacific Palisades, and Connelly L. Graham, Covina, Calif., assignors to Northrop Aircraft, Inc., Hawthorne, Calif., a corporation of California Application June 25, 1953, Serial No. 364,084

15 Claims. (Cl. 244—137)

Our invention relates to the carrying and handling of releasable objects such as rockets, missiles and bombs on military land, sea and air combat craft, and more particularly to a method of storing and transporting aboard any transport aircraft a plurality of unpowered stores cells in a single tubular chamber and releasing them successively therefrom.

Among the objects of this invention are:

To provide means for increasing the carrying capacity of an airplane without increasing its frontal area.

To provide means for reducing the frontal area formerly required in storing and carrying a specified airborne load.

To provide a simple means for ejecting stores cells from an airplane.

To provide means allowing flexibility in the placement of stores cells within or upon an airplane.

To provide means for storing a plurality of stores cells with or upon an airplane and for releasing them either singly or in cascading sequence.

In brief, our invention comprises a generally tubular chamber for use in an airplane, either enclosed within the main fuselage body of the aircraft or in a blister thereon, or carried outboard as an independent pod-like enclosure adapted to be jettisonable itself if desired.

The stores cells are carried within the chamber in tandem arrangement. In one form of the invention, an air duct surrounding the cell chamber, has an air inlet at its forwardmost end and individual air diversion gates at the forwardmost end of each of the stores cells, through which ram air is directed into the chamber beginning with the gate adjacent the rearwardmost cell, to force the cells successively out of the chamber.

So that this invention may be better understood both in the form above mentioned and in various combinative arrangements in which it may be used, a more detailed description will be given and drawings appended in which:

Figure 5 is a longitudinal sectional diagram of another form of launching tube embodying this invention in which the tube is given a square sectional conformation to accommodate flat sided, substantially rectangular stores cells.

Figure 6 is a cross sectional view through the square launching chamber of Figure 5 as indicated by arrows 6, showing peripheral contour of the nacelle and the location of the operating units therein.

Figure 6a is a schematic cross sectional diagram showing a further variation of nacelle arrangement adapted to include two longitudinal cell chambers.

Figure 6b is also a schematic cross sectional diagram showing the nacelle enlarged to include four longitudinal launching tubes, all supplied with ram air from a single central air passage.

Figure 1:
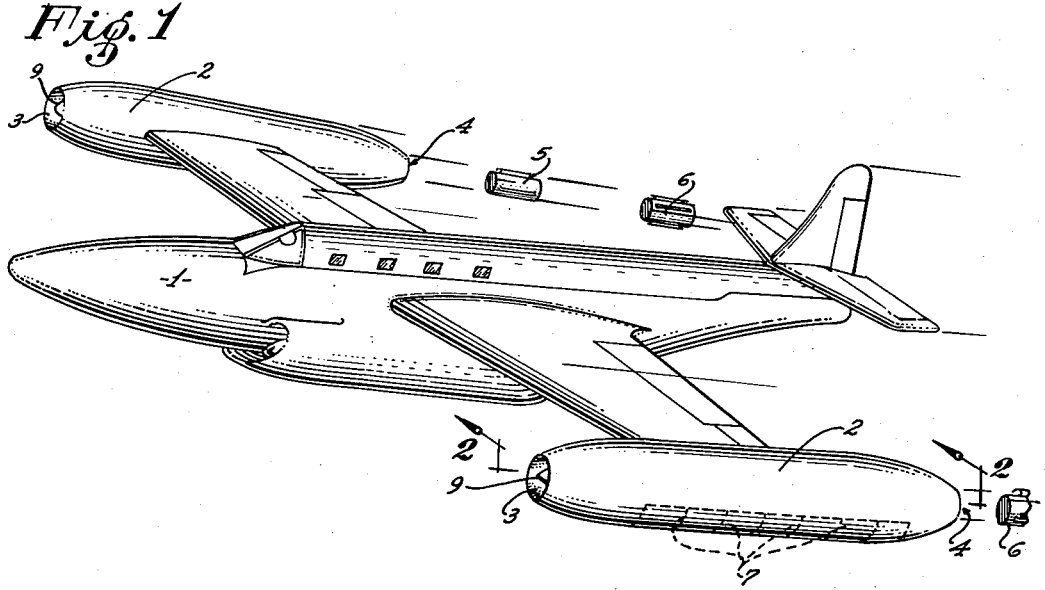
Figure 1 is a diagrammatic perspective view of an airplane fitted with wing tip nacelles in which ram air powered launching tubes of the present invention are used.
Figure 4:
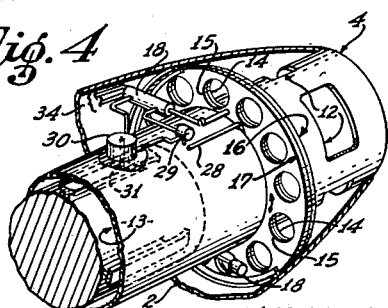
Figure 4 is a fragmentary diagrammatic view in perspective of the aft section of the nacelle with surface areas cut away to show details of the rotary disc air gate as seen from direction of arrow 4 in Figure 2.

Referring first to Figure 1, a jet driven airplane 1 is fitted with wing tip pod-like nacelles 2, each of these nacelles 2 having an air inlet aperture 3 at its nose tip and a combined air exhaust outlet and stores cell egress opening 4 at the line of truncation of its aft tail cone as best seen in Figure 4. Suitable access doors 7 are provided in lower surfaces of nacelles 2.

Figure 2:
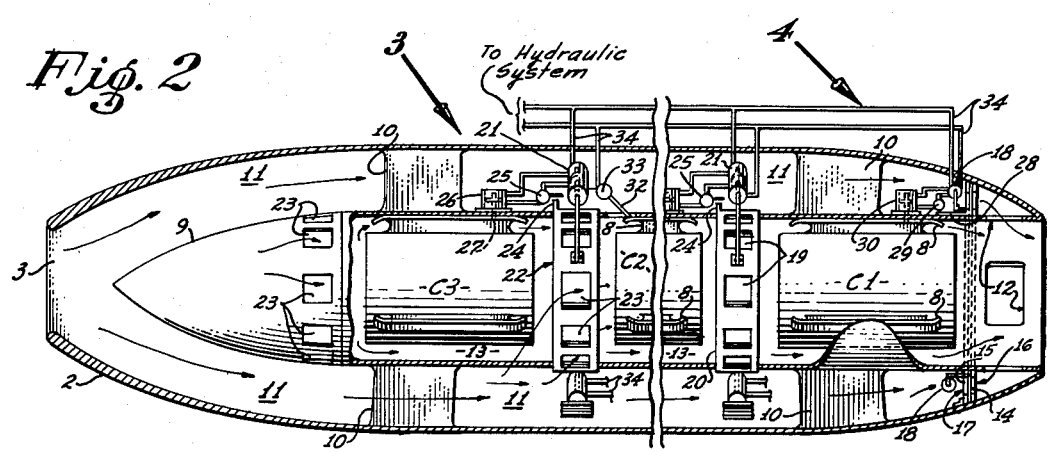
Figure 2 is a diagrammatic fragmentary longitudinal sectional view of the left wing nacelle in the direction of arrows 2 in Figure 1, showing one form of launching tube embodying the present invention having a plurality of stores cells therein.

Supported in central alignment in each nacelle 2 is a stores cell tandem launching tube 9 nose tips of which are visible in Figure 1 with details of one preferred embodiment shown in longitudinal section in Figure 2 wherein the launching tube 9 is held in position within nacelle 2 by a plurality of substantially rectangular radially disposed spacing brackets 10 so that ram air entering at air inlet 3 is permitted to flow rearwardly through air passage 11 separating tube 9 from inner periphery of nacelle 2, through aligning perforations 14 and 15 in discs 16 and 17, then inwardly through circumferentially disposed perforations 12 in wall of launching tube 9 into egress channel 13 and expelled through exhaust outlet 4. The aligning perforations in discs 16 and 17 as well as the circumferential perforations 12 in rearward section of tube 9 are adapted to handle collectively a greater volume of air than would normally be admitted through the inlet opening 3, thereby minimizing the drag effect of back pressure within the air passage 11.

Referring again to Figure 2, it should be noted that the stores cells shown within launching tube 9 are designated, starting from the right or most rearward, C–1, C–2 and C–3 progressively toward the nose of the nacelle, and forwardly in the direction of flight of the airplane. Although only three cells have been indicated in Figure 2, it is to be understood that the number of cells carried is limited only by the relative length of the cells and that of the nacelle and launching tube used.

Figure 3:
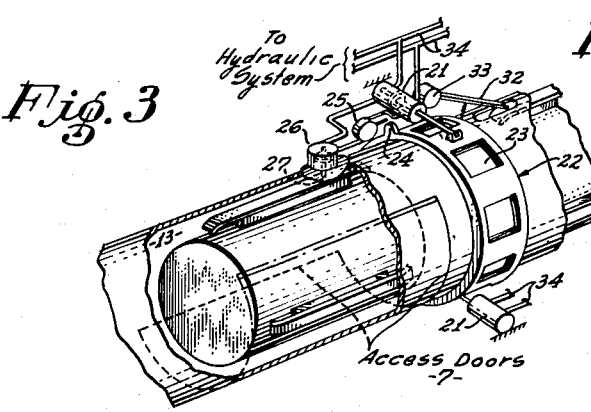
Figure 3 is a schematic perspective diagram of the cell chamber in Figure 2 with various surfaces cut away to make the positioning of components and their operation more understandable.

Until the launching operation is begun the ram air during flight of the aircraft enters the nacelle 2 at inlet 3, is diverted around forwardly extending point of tube 9 and follows a direct generally horizontal path through passage 11, past circumferential openings 23 at forwardmost ends of stores cells C–3 and C–2 and openings 19 adjacent forward end of cell C–1, through aligning perforations in discs 16 and 17, then through rearward openings 12 and outboard via rearwardmost aperture 4, each stores cell being held firmly in its proper relative position by a positioning pin such as 27 in Figures 2 and 3.

The release and launching of the first of the cells, the cell most rearwardly disposed within the tube such as C–1 in Figure 2, is initiated by operation of suitable conventional remote control means (not claimed as a part of this invention), which opens a pressure line valve admitting pressure to actuating cylinders 18 in Figures 2 and 4 which serve to rotate perforated disc 17 displacing its perforations 15 from alignment with perforations 14 in stationary baffle 16, finally completely blocking the air passage 11 at baffle 16. As the rotatable disc 17 reaches the fully closed position a valve lever 29 is engaged by a stud 28 attached to disc 17 and opens the pressure supply line to cylinder 30 which retracts the positioning pin 31 from engagement with cell C-1.

Meanwhile back pressure, caused by the restricted airflow, builds up sufficiently to divert incoming ram air through perforations 19 in circumferentially movable band 20 positioned immediately forward of the forward most end of cell C-1, forcing the cell to slide rearwardly on its axially aligned circumferentially spaced runners 8 and out the egress aperture 4 at rearwardmost end of nacelle, completely clear of the airplane and out of its flight path as indicated by cells 5 and 6 in the upper portion of Figure 1.

All of the cell-operating mechanisms forward of the rearwardmost cell C-1 employ the perforated circumferential band type of air diversion gate the closure of which blocks the rearward movement of ram air in passage 11 and diverts it through perforations of next forwardly gate forcing rearwardly the cell having its forwardmost end adjacent to the inmoving airstream, as soon as the positioning pin is retracted.

It can be seen that these two operative steps are interdependent and, furthermore, that the ejection of the cells must be effected in unbroken orderly succession beginning with the rearwardmost and ending with the forwardmost of the longitudinally aligned plurality of cells. And although it has been indicated in the preceding description that the launching of each cell is initiated individually by a remotely positioned crew member, it can be readily understood that simple mechanical or electrical means can be utilized to progressively interconnect the cell-operating mechanisms to provide continuous cascading launching of all of the cells within one tube following a single initiating step.

One such automatic sequencing means is shown between cells C-2 and C-3 wherein the rearward movement of cell C-2 permits spring-loaded plunger 32 to move inwardly of chamber 13 opening valve 33 and admitting pressure to cylinder 21, thus initiating the mechanical cycle required to move the next forwardly cell C-3.

As can be seen in Figure 2, the circumferential openings in tube 9 nearest the air inlet aperture 3 are fixedly open and not equipped with the perforated band closure means used immediately forward of each of the cells, such as C-2, intermediate the two cells at the forward and rearward extremities of the tube.

All of the pressure cylinders used to operate the ram air diversion gates are double acting and are served by a common reversing pressure line 34 in Figures 2, 3 and 4, thus enabling a remotely stationed crew member to return simultaneously all of the diversion gates to their original open position and reduce as much as possible the drag caused by back pressure and air flow friction induced when the most direct air passages are closed.

Somewhat different construction and mechanical means for air stream diversion and cell release are used in the embodiment of this invention shown in Figures 5 and 6, wherein the launching tube 46 is adapted for the stowage of a plurality of substantially square stores cells, as is best seen in cross-sectional view in Figure 6. Ram air enters nacelle enclosure 2 through frontal inlet aperture 35 and moves rearwardly through air passage 36 in a substantially straight line to point within tail cone where it is deflected downwardly into rearwardmost section of launching tube through transverse horizontal disposed openings 36a in top of launching chamber 46 and thence outboard through air and stores cell egress aperture 37 at rearward termination of nacelle.

The release and launching cycle is initiated by the introduction of pressure in cylinder 38 which retracts and draws linkage members 39 and 40 rearwardly raising ram air diversion door 41 to a diagonally upright position completely blocking air stream in passage 36 and simultaneously withdrawing positioning pin 43 from engagement with detent 44 in fin of stores cell C-4, causing the cell to move rearwardly on guide channels 45 and out through egress aperture 37. Exit of cell C-4 provides clearance for upward swinging of door 50 on hinge line 51 as the next forwardly cell C-5 is similarly released by retraction of piston 52 in cylinder 53 and pushes door 50 out of its path and into engagement with spring catch 48 on upper interior surface of cell C-4 section of tube 46. As explained in connection with the operative system first described, a single pressure supply line connected to pressure cylinders at inlet points 54 would serve to cause reverse movement of the pistons, swinging the air diversion doors back to their normally closed positions, clearing air passage 36 for unimpaired transit of ram air.

The manner in which two launching tubes can be incorporated into a single nacelle enclosure having a single axially disposed ram air passage, adapted to serve both tubes through alternately sequenced diversion doors, is shown in the sectional diagram of Figure 6a, and Figure 6b illustrates one method of grouping four square-sectioned launching tubes around a central axially aligned direct ram air passage into which the air diversion doors of all of the launching tubes are progressively extended. Also shown in this figure is one preferred means of enclosing the group of tubes in a suitably contoured nacelle adapted for quick attachment to an airplane by means of a conventional under-wing pylon having built-in remotely controlled attachment shackle releasing means which can be used, after launching the stores cells, to jettison the entire nacelle itself, if desired.

In the embodiment of this invention including the means shown in Figures 1 to 4, the stores cells stowed within the launching tubes to be subsequently released therefrom were of definite and regular cylindrical conformation, and in the views shown in Figures 5 through 6b the cells were flat sided and substantially square in cross section, and were shown to be bevelled from each flat side to a pointed frontal apex and, furthermore, were shown as having axially aligned radially disposed fins. It should be understood that we do not desire to be limited to any particular configuration of the stores cells to be manipulated by the means and in the manner previously set forth. In fact the two radically different cell forms are purposely selected as examples to illustrate the adaptability of the means covered by this invention. Other structural and mechanical features have also been described in more or less specific language in order to comply with the statute, but it is to be understood that this invention is not limited to the specific features shown, but that the means and construction herein disclosed comprise typical and preferred forms of putting this invention into effect, and the invention is, therefore, claimed in any of the forms or modifications within the legitimate and valid scope of the appended claims.

What is claimed is:

1. In an airplane, a stores cell launcher which comprises: a generally tubular launching chamber longitudinally disposed in the line of flight of the aircraft, closed at its forward end and open at its rearward end, a plurality of stores cells stowed in tandem alignment within said launching chamber and adapted in cross-sectional contour to fit slidably therein; said launching chamber having a plurality of openings in its wall spaced to provide an opening at the forwardmost end of each of said stores cells stowed therein; means for creating air pressure at each of said openings; closure means operable at each of said openings; positioning means, operable with said closure means, adapted to secure said stores cells within said launching chamber; and means for sequential release of said positioning means and operation of said plurality of closure means to direct the air pressure through said openings at forward ends of said stores cells starting with the rearwardmost of said stores cells, said air pressure being adapted to force said stores cells successively rearwardly through said launching chamber and out of the open end thereof.

2. Apparatus in accordance with claim 1 in which said means for creating air pressure comprise: an air inlet opening in a frontal surface of the aircraft; ducting means to direct said ram air admitted through said air inlet opening to said openings in side of said launching chamber wherein it is utilized to force said stores cells rearwardly and out the open end thereof.

3. Apparatus in accordance with claim 2 in which said closure means operable at each of said openings in said wall of said launching chamber consist of: a circular sleeve-like member having alternate solid and perforated areas spaced around its circumferential surface, said sleeve being movably fitted to an individual section of the outer periphery of said launching chamber; said individual section of said launching chamber having a plurality of openings in its circumferential periphery, said openings being adapted in spacing to align with said openings in said sleeve; control means operable at said openings for moving said sleeve relative to said chamber periphery to bring the solid sections of said sleeve over said openings in said individual chamber section to prevent entry of said ram air and, conversely, to bring said openings in said sleeve and chamber into facing coincidence to permit entry of said ram air.

4. In an airplane, a stores cell launcher which comprises: a generally tubular launching chamber longitudinally disposed in the line of flight of the aircraft, closed at its forward end and open at its rearward end, and having a plurality of openings in its wall spaced to provide intervening chamber portions adapted to contain stores cells to be loaded therein; closure means operable at each of said openings; positioning means, operable with said closure means, adapted to secure stores cells to be loaded within said launching chamber; an outer tubular chamber similar in conformation to said launching chamber and open at both ends, disposed concentrically around said launching chamber so as to provide an inter tubular air passage; means for closing said inter tubular air passage adjacent said open rearward end of said launching chamber; means for sequential release of said positioning means and operation of said plurality of closure means to direct the air pressure through said openings at forward ends of said chamber portions starting with the rearwardmost of said chamber portions, said air pressure being adapted to force stores cells which are to be loaded within said chamber portions successively rearwardly through said launching chamber and out the open end thereof.

5. Apparatus in accordance with claim 4 in which the forward open end of said outer tubular member is adapted to admit ram air into said inter tubular passage during flight of the aircraft, said ram air pressure being utilized to force said stores cells to be displaced therein rearwardly through said launching chamber and out the open end thereof.

6. In an airplane, a stores cell launcher which comprises: a generally tubular launching chamber longitudinally disposed in the line of flight of the aircraft, closed at its forward end and open at its rearward end; a plurality of stores cells stowed in tandem alignment within said launching chamber and adapted in cross-sectional contour to fit slideably therein; said launching chamber having a plurality of openings in its wall spaced to provide an opening adjacent the forwardmost end of each of said stores cells loaded therein; closure means operable at each of said openings; positioning means linked to said closure means and adapted to secure stores cells within said launching chamber; an outer tubular chamber similar in conformation to said launching chamber and open at both ends, disposed concentrically around said launching chamber so as to provide an inter tubular air passage; means for closing said inter tubular air passage adjacent said open rearward end of said launching chamber; means for sequential release of said positioning means and operation of said plurality of closure means to direct the air pressure through said openings at forward ends of said stores cells starting with the rearwardmost thereof, said air pressure being adapted to force said stores cells successively rearwardly through said launching chamber and out the open end thereof.

7. Apparatus in accordance with claim 6 in which the forward open end of said outer tubular member is adapted to admit ram air into said inner tubular passage during flight of the aircraft, said ram air pressure being utilized to force said stores cells rearwardly through said launching chamber and out the open end thereof.

8. Apparatus in accordance with claim 6 wherein said positioning means for securing said stores cells within said launching chamber comprise at least: a plurality of positioning pins extending through the wall of said launching chamber into detents in longitudinal skid members attached to said stores cells; pressure operated means for retraction of said positioning pins from said skid members; means for controlling said retraction of said positioning pins consisting of studs extending from said movable sleeves of said closures for said openings into said launching chamber and adapted, upon movement of said sleeves to the closed position, to open valves admitting pressure to said retraction means.

9. Apparatus in accordance with claim 6 wherein said means for closing said inter tubular air passage between said outer chamber and said launching chamber at a point adjacent the rearward end thereof comprise at least the following: a stationary bulkhead disposed perpendicularly to the longitudinal axis of said launching chamber between said outer chamber and said launching chamber; a washer-like closure disc similar in size and conformation to said bulkhead member, movably mounted against the forwardly facing surface of said bulkhead, said bulkhead and said disc having a plurality of aligning openings alternately spaced between solid surface sections of slightly greater area; pressure operated means for rotating said disc across surface of said bulkhead so that the solid areas of said disc completely cover said openings in said bulkhead, thereby closing said inter tubular air passage and diverting said ram air therein through the rearwardmost of said openings in said launching chamber; said closure disc being further adapted with means for retracting positioning pin from said rearwardmost stores cell, in accordance with claim 10, permitting said cell to be forced rearwardly and out of the open end of said launching chamber.

10. In an airplane, a stores cell launcher comprising: a plurality of generally tubular launching chambers, closed at their forward ends and open at their rearward ends, longitudinally disposed paralleling each other in the line of flight of the aircraft and laterally disposed equidistant from a common longitudinal axis, each of said chambers having a plurality of longitudinal wall sections and a plurality of spaced openings in one of said sections; a central hollow conduit having a plurality of longitudinal wall sections with spaced openings therein, said conduit being open at both ends and disposed concentrically with said common longitudinal axis of said launching chambers and adapted to have one of its longitudinal wall sections juxtaposed with one of said launching chambers along its wall section having the spaced openings therein, said openings in said conduit and launching chamber being positioned to align when said wall sections are in juxtaposition, and spaced from each other to provide portions of said chamber between said openings adapted to contain stores cells to be loaded therein, and to provide an opening from said central conduit to the forwardmost end of each of said stores cells to be loaded in each of said separate launching chambers; means for creating air pressure at each of said openings; closure means operable at each of said openings;

and means for sequential operation of said closure means to admit air pressure through said openings into said launching chambers.

11. Apparatus in accordance with claim 10 wherein ram air, admitted through the forward end of said central conduit adjacent said closed ends of said launching chambers, is utilized to provide the required air pressure.

12. In an airplane, a stores cell launcher comprising: a plurality of generally tubular launching chambers, closed at their forward ends and open at their rearward ends, longitudinally disposed paralleling each other in the line of flight of the aircraft and laterally disposed equidistant from a common longitudinal axis; a central hollow conduit open at both ends and disposed concentrically with said common longitudinal axis of said launching chambers and adapted to have one longitudinal wall section of its outer periphery juxtaposed with an aligning wall section of one of said launching chambers; a plurality of stores cells stowed in tandem arrangement within each of said launching chambers, said cells being adapted in cross sectional contour to fit slideably within said chambers; each of said walls of said central conduit and the wall of said chamber adjoining said central conduit having a plurality of openings therein spaced to provide an opening from said central conduit to the forwardmost end of each of said stores cells in each of said separate launching chambers; means for creating air pressure at each of said openings; closure means operable at each of said openings; positioning means, linked to said closure means, adapted to secure said stores cells within said launching chambers; and means for sequential release of said positioning means and for operation of said closure means to admit air pressure through said openings into said launching chambers.

13. Apparatus in accordance with claim 12 wherein the forward open end of said central conduit, adjacent said closed ends of said launching chambers, is adapted to admit ram air to said central conduit during flight of the aircraft, said ram air being utilized to provide the required air pressure.

14. Apparatus in accordance with claim 13 wherein said closure means consist of a plurality of covers, fitted over said openings in said side walls of said central conduit, hinged along their edges spaced farthest from the forward ends of said launching chambers and central conduit, and adapted to swing into and diagonally across said central conduit to direct said ram air through said openings at forwardmost ends of said stores cells, forcing them successively rearwardly through their respective launching chambers and out the open ends thereof.

15. Apparatus in accordance with claim 14 in which said stores cells, said openings and said covers are positioned and spaced in a helical pattern around and within said central conduit, the order of operation being sequenced from one launching chamber to the next around said longitudinal axis of said plurality of launching chambers, and being progressively increased in spacing from the rearward end of said central conduit, in a manner adapted to prevent overlapping and interference of said hinged covers when swung across said central conduit.

References Cited in the file of this patent
UNITED STATES PATENTS

| | | |
|---|---|---|
| 742,513 | Stoddard | Oct. 27, 1903 |
| 768,031 | Burton | Aug. 23, 1904 |
| 2,381,332 | Boldt | Aug. 7, 1945 |
| 2,479,746 | I'Anson | Aug. 23, 1949 |